United States Patent
Kametani et al.

[11] 3,984,295
[45] Oct. 5, 1976

[54] METHOD FOR GALVANICALLY WINNING OR REFINING COPPER

[75] Inventors: Hiroshi Kametani, Tokyo; Aiko Aoki, Chofu, both of Japan

[73] Assignee: National Research Institute for Metals, Tokyo, Japan

[22] Filed: Mar. 24, 1975

[21] Appl. No.: 561,545

[30] Foreign Application Priority Data
Mar. 30, 1974 Japan............................ 49-35172

[52] U.S. Cl............................ 204/107; 204/108; 204/248
[51] Int. Cl.² ...................... C25B 1/12; C25B 5/02; C25B 7/00
[58] Field of Search ............ 204/106, 107, 108, 248

[56] References Cited
UNITED STATES PATENTS

| | | | |
|---|---|---|---|
| 720,235 | 2/1903 | Frasch | 204/107 |
| 3,736,238 | 5/1973 | Kruesi et al. | 204/113 |
| 3,787,293 | 1/1974 | Kametani | 204/113 |
| 3,836,443 | 9/1974 | MacGregor | 204/113 |

FOREIGN PATENTS OR APPLICATIONS

| | | | |
|---|---|---|---|
| 12,208 | 8/1888 | United Kingdom | 204/248 |

OTHER PUBLICATIONS

"The Galvanic Series", Hanson–Van Winkle–Munning Co., 1960.

Primary Examiner—R. L. Andrews
Attorney, Agent, or Firm—Sherman & Shalloway

[57] ABSTRACT

A method for electrochemically refining copper, which comprises placing a catholyte solution consisting of a copper ion aqueous solution and an anolyte solution consisting of an aqueous dispersion of particles of matte, white metal or blister copper or particles of ferrous hydroxide in an electrolyte in a cathode compartment and the anode compartment, respectively of a galvanic cell partitioned into the cathode compartment and the anode compartment by a diaphragm; and short-circuiting a cathode dipped in the catholytic solution and an anode dipped in the anolyte solution by means of a conductor while maintaining the pH of the catholyte solution at −1 to 5 and the pH of the anolyte solution at 8 to 14, thereby to precipitate pure copper on the cathode.

20 Claims, 4 Drawing Figures

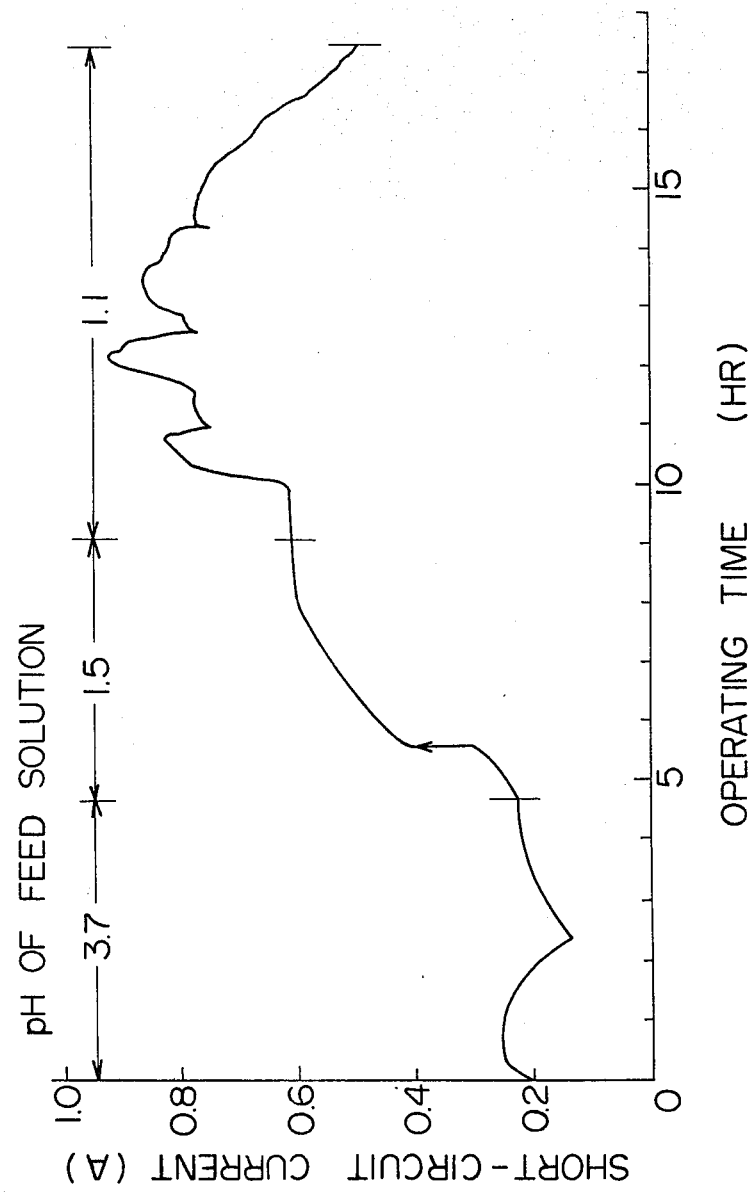

METHOD FOR GALVANICALLY WINNING OR REFINING COPPER

This invention relates to a method for winning copper electrochemically from a solution containing a copper ion without using an external supply of electricity, and more specifically, to a method for obtaining pure copper by electrochemically refining matte containing an abundance of cuprous sulfide, white metal, or blister copper.

Conventional methods for refining copper comprise the following steps:

1. heating raw ore or calcined ore to a high temperature in a melting furnace together with a flux to form a matte rich in cuprous sulfide and a slag, and separating the matte;
2. placing the matte in a converter and blowing air into the molten matte to convert it to blister copper in accordance with the following reaction equation (1)

$$Cu_2S + O_2 \rightarrow 2Cu + SO_2 \qquad (1)$$

3. placing the molten blister copper in a refining furnace and adding a reducing agent to obtain refined blister copper; and
4. casting the refined blister copper, and electrolyzing a copper sulfate solution using the cast copper plate as an anode and an electrolytic copper electrode as a cathode.

The converter step of the above conventional copper refining methods, that is, the oxidation reaction of cuprous sulfide based on the reaction equation (1) generates vigorous exothermic heat, which heat has not been fully utilized previously. Furthermore, the conventional copper refining methods consume a large quantity of electric power in the electrolytic refining step.

Accordingly, it is an object of this invention to provide a method for winning or refining copper electrochemically without an external supply of electric power.

Another object of this invention is to provide a method for winning or refining copper electrochemically by utilizing chemical energy generated by the oxidation of copper sulfide, metallic copper or ferrous hydroxide.

The above objects of this invention are achieved in accordance with this invention by a method for winning or refining copper electrochemically which comprises placing a cathode solution consisting of an aqueous solution of a copper ion and an anolyte suspension consisting of an aqueous dispersion of particles of a matte, white metal, or blister copper or particles of ferrous hydroxide in an electrolyte in a positive electrode (hereafter called cathode) compartment and a negative electrode (hereafter called anode) compartment, respectively, of a galvanic cell partitioned into the cathode compartment and the anode compartment with a diaphragm; and then short-circuiting a cathode dipped in the catholyte solution and an anode dipped in the anolyte suspension by means of a conductor, while maintaining the pH of the catholyte solution at −1 to 5 and the pH of the anolyte suspension at 8 to 14, thereby to precipitate pure copper on the cathode.

A novel aspect of this invention is that a galvanic cell is formed by combining the oxidation of copper sulfide, metallic copper or ferrous hydroxide in alkaline aqueous solutions with the reduction of copper ions in acidic aqueous solution, and pure copper is precipitated on the cathode by the electricity generating action of the cell.

According to the method of this invention, pure copper can be obtained electrochemically from solutions containing copper ions without requiring any external supply of electric power.

The principle of the method of this invention is described as follows:

When metalic copper particles are suspended, for example, in an aqueous solution containing 1 mol/liter of $CuSO_4$ at 90°C., there is obtained a potential of about 0.1V as measured at a pH of less than about 1.8 using a platinum electrode-saturated calomel electrode. Furthermore, when particles of a white metal are suspended in a solution containing 0.1 mol/liter of $(NH_4)_2SO_4$ at 90°C., there is obtained a potential of −0.1 to 0.2V (measured in the same way as above) at a pH of 9 to 10. Accordingly, when these two suspensions are in contact through a diaphragm, a galvanic cell is formed. The acidic side becomes a cathode and the alkaline side becomes an anode, and the potential of the cell is the difference in potential between these two suspensions, that is, 0.2 to 0.3V. By short-circuiting the electrodes dipped in these solutions with a conductor, an external electric current flows from the cathode to the anode through the conductor, and incident to this, metalic copper is precipitated in the cathodic side (the $Cu—SO_4—H_2O$ system) while the white metal is oxidized and dissolved in the anodic side [the white metal $—(NH_4)_2SO_4—H_2O$ system]. In this manner, pure copper is obtained from the white metal.

When ferrous hydroxide is suspended in an anodic solution having a pH of 8 to 10, a potential (as measured by using the same electrodes as mentioned above) of −0.5 to −0.7V is obtained, and pure copper is precipitated on the cathode in the same way as mentioned above.

A preferred embodiment of the method of this invention will be described below by reference to the accompanying drawings in which:

FIG. 4 is a graphic representation showing the relation of the pH of the catholyte solution to the short-circuiting current in an electrolytic cell.

Figure 1:
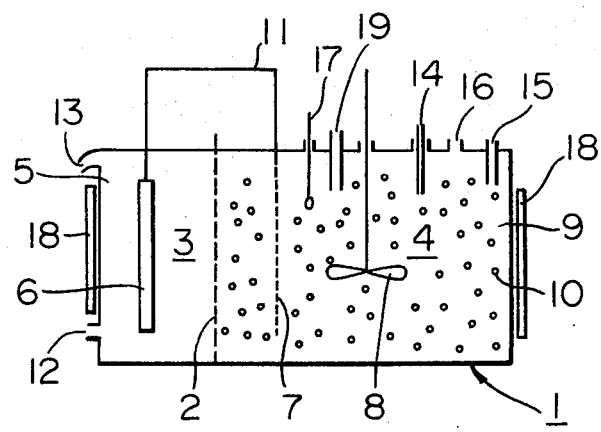
FIG. 1 is a schematic cross-sectional view of one example of a device used in the method of this invention.

In FIG. 1, an electrolytic cell 1 which functions as a galvanic cell is divided into a cathode compartment 3 and an anode compartment 4 with a diaphragm 2. A catholyte solution 5 is placed in the cathode compartment 3, and a copper electrode 6 is immersed in the catholyte solution. The anode compartment 4 is provided with a netlike insoluble anode plate 7 and a stirrer 8, and by means of the stirrer, white metal particles 10 are suspended in an anolyte solution 9. When the cathode is connected to the anode by means of a conductor 11, a short-circuit current flows through the conductor 11 in accordance with the above principle, and metallic copper is precipitated on the cathode plate.

The catholyte solution 5 is usually fed and discharged continuously into and out of the cathode compartment 3 via an inlet opening 12 and an outlet opening 13. The operation can also be performed batchwise. The cathode solution discharged in the method of continuously feeding and discharging can be refined by a conventional hydrometallurgical method and recycled.

The catholytic solution is an acidic aqueous solution containing copper ions, such as a sulfuric acid-acidified solution of cupric sulfate or a hydrochloric acid-acidified solution of cuprous chloride and/or cupric chloride.

The concentration of the copper ion in the catholyte solution is not particularly critical, but may be below the saturation concentration, which is dependent on the temperature of the solution. However, concentrations in the range of 5 to 70 g/liter, as monovalent or divalent copper ions, are usually employed, and preferably, the concentrations are 10 to 50 g/liter.

The pH of the catholyte solution is within the range of −1 to 4, preferably 0 to 1.5.

The anolyte solution is a suspension of particles of a matte, white metal, blister copper, or ferrous hydroxide in a basic aqueous solution of a salt such as ammonium sulfate, ammonium chloride, or sodium chloride made basic with a base such as ammonium hydroxide or sodium hydroxide.

The concentration of the salts in the anolyte solution is not critical in particular, but is usually 0.05 to 2 mols/liter, preferably 0.1 to 1.0 mol/liter.

In the case of the batchwise method, a copper salt capable of forming a copper ion, such as copper sulfate or copper chloride, can be added to the catholyte solution in advance. The amount of the copper salt varies according to the operating conditions and the temperature of the electrolytic cell, and is not critical in particular. Usually, the amount of the copper salt is 0.01 mol/liter to the saturation concentration, preferably 0.1 to 1.5 mol/liter.

In order to promote the reaction, the particles of the matte, white metal, blister copper or ferrous hydroxide preferably have a particle size of not greater than 100 mesh, preferably not greater than 200 mesh.

The rate of reaction increases with a higher concentration of the particles of the matte, white metal, crude copper or ferrous hydroxide, but from the viewpoint of the transportation and stirring of the suspension, the concentration of these particles is preferably maintained at 300 to 600g/liter. However, the above particle size and the concentration of the particles in the suspension are not limited to the ranges specified above.

The ferrous hydroxide particles can conveniently be formed in the anode compartmemt. When an aqueous solution of ferrous chloride or ferrous sulfate, for example, is fed into the anode compartment, a ferrous ion in the feed solution reacts with alkali in the anode compartment to form particles of ferrous hydroxide.

A suspension of ferrous hydroxide can also be prepared separately, and then fed into the anode compartment.

The pH of the anolyte solution needs to be maintained within the range of 8 to 14, preferably 8.5 to 9.5

The diaphragms that can be used in this invention may be water-impermeable diaphragms such as ion-exchange membranes, water-permeable diaphragms, for example, woven cloths such as saran fiber woven fabrics or glass fiber woven fabrics, porous membranes such as a glass sintered plate, or a porous Teflon film.

The water-impermeable diaphgrams can make the catholyte solution quite independent from the anolyte solution, whereas the water-permeable diaphragms permit the mixing of the catholyte solution with the anolyte solution. In the latter case, therefore, the hydraulic pressure of the catholyte solution is made just a little bit higher than that of the anolyte solution so as to prevent impurities from migrating to the cathode compartment.

The pH adjustment of the anolyte solution and the catholyte solution is very important. When a water-permeable diaphragm is used, the acidic catholyte solution migrating through the diaphragm must be alkalized by adding ammonium hydroxide or sodium hydroxide to the anode compartment during the reaction. For this adjustment, the pH of the anolyte solution is measured using glass and a reference electrode 14, and the alkaline solution is added from an opening 15.

Usually, the anolyte solution 9 is continuously fed into the anode compartment 4 from the inlet 19 together with the material, that is, the matte, white metal, blister copper, or ferrous hydroxide particles. The reaction product formed by the reaction within the electrolytic cell is continuously discharged from an overflow opening 16 together with the anolyte solution. The operation can also be performed batchwise. In the method comprising continuously feeding and discharging the anolyte solution and the electrolyzing material into and out of the anode compartment, the anolyte solution discharged can be refined by a conventional hydrometallurgical method.

A starting plate of pure copper is most desirable as the cathode used in this invention because of its simplicity of handling. Alternatively, however, a stainless steel plate or a titanium plate can also be used as the cathode plate, and after electrolysis, pure copper precipitated on this plate may be collected.

The charge within the anode compartment is always maintained in the suspended state by means of the stirrer 8. Accordingly, the anode used is generally of a net-like or lath-like shape in order to ensure a good stirring of the anolyte suspension.

The anode is made, for example, of a platinum electrode, a platinum-plated electrode, a carbon electrode or an oxide-coated electrode.

A suspended electrode produced by stirring a pure copper powder in a catholyte solution can also be used as the cathode in this invention. The suspended electrode is described in detail in U.S. Pat. No. 2,787,293.

Figure 2:
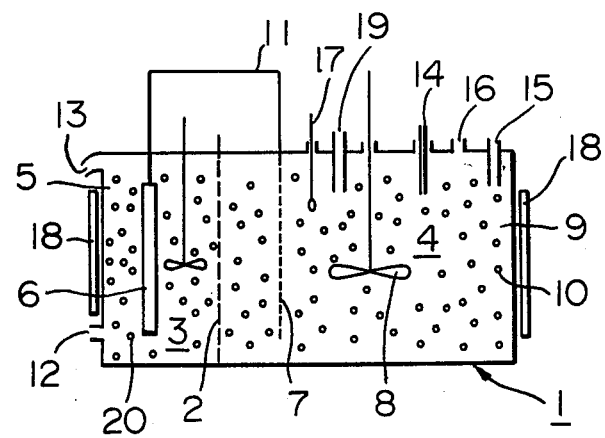
FIG. 2 is another example of the device shown in FIG. 1 modified so that metallic copper particles are suspended in a cathodic solution.

FIG. 2 shows an example in which the suspension electrode is used.

Referring to FIG. 2, the cathode compartment 3 consists of a fixed electrode 6 and pure copper seeds 20 suspended in the catholyte solution 5. When the electrodes 6 and 7 are short-circuited by means of the conductor 11, metallic copper precipitates on the surface of the copper particles and pure copper is obtained in the form of grown particles.

The efficiency of copper precipitation in accordance with the method of this invention, that is, the rate of copper precipitation, is dominated mainly by the rate of reaction of the white metal in the anode compartment. The rate of reaction can be increased effectively by elevating the temperature of the electrolytic cell as well as by reducing the size of the white metal particles and increasing the concentration of the white metal in the suspension. The elevated temperature of the cell also contributes to a reduction in the resistance of the cell. Accordingly, the temperature of the cell is desirably adjusted to at least 50°C., preferably at least 60°C. Usually, the cell temperature is 70° to 90°C. When the cell is a closed type, its temperature is not necessarily limited to below the boiling point of the solution at atmospheric pressure, and the reaction can be carried out at high temperatures and elevated pressures. By increasing the rate of reaction in this manner, not only is electrical energy consumed within the cell by short-circuiting the cathode and the anode, but also the electrical energy can be supplied to outside the cell, thus using the cell as a low-voltage direct current source. This is evident from the fact that this electrolytic cell essentially has a function of a galvanic cell.

Control of the cell temperature can be performed by a thermometer 17 and a heater 18.

The matte or white metal used in this invention is an intermediate product obtained during the refining of copper, and generally contains some amount of iron. The iron content may vary continuously according to the refining conditions. Generally, the iron content is less than 35% for the matte, and less than 5% for the white metal. With increasing iron content, the reactivity of th matte or white metal increases, and the suspension potential in the alkaline region decreases. On the other hand, because the reaction of iron sulfide is faster than copper sulfide, the oxidized iron precipitates as iron hydroxide in the alkaline region. Thus, when the iron content is too high, the operation becomes difficult. The desirable iron concentration is therefore not more than 10%.

Figure 3:
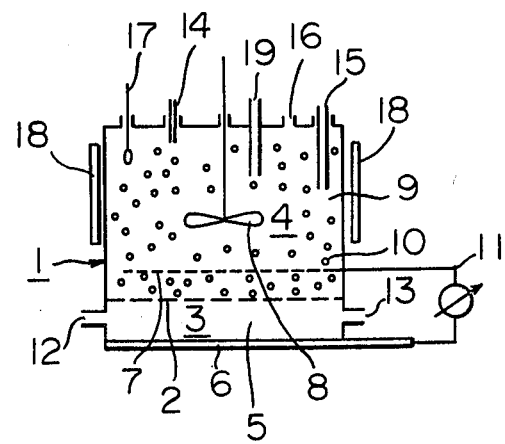
FIG. 3 is another example of the device shown in FIG. 1 modified so that a cathode compartment and an anode compartment are arranged vertically.

The arrangement of the cathode compartment and the anode compartment is not limited to the horizontal arrangement illustrated in FIGS. 1 and 2, but can be aligned vertically as illustrated in FIG. 3.

The following Examples further illlustrate the present invention.

EXAMPLE 1

In this Example, a cylindrical cell illustrated in FIG. 3 was used. The cell having an inside diameter of 14 cm and a height of about 12 cm was divided into an anode compartment 4 at the upper part and a cathode compartment 3 at the lower part by means of a diaphragm 2 of a woven fabric made of saran fibers. A copper plate was used as a cathode 6, and a catholyte solution 5 was fed into the cathode compartment 3 from an inlet opening 12 at a rate of 20 ml/min. Since the diaphragm was water permeable, the outlet 13 of the cathode compartment was closed. Therefore, all the catholyte feed solution moved to the anode compartment through the diaphragm, and was finally discharged from the cell through an overflow opening 16.

The catholyte feed solution was an aqueous solution of copper sulfate acidified with sulfuric acid, and the concentration of copper ions was maintained at 32g/liter throughout the entire period of operation. The pH of the catholyte solution was maintained at 3.7 for the first 5 hours, 1.5 for the next 5 hours, and 1.1 for the last 7.5 hours.

The anode 7 was a platinum gauze. During the operation, the pH of the anolyte solution (the feed solution which passed through the diaphragm) was always measured by means of glass and a reference electrode 14, and a conc. solution of ammonia was added it from an opening 15 to maintain the pH of the anolyte solution at 9.8 to 10.1. 400 g of white metal (79.3% Cu) having a size of −200 mesh was suspended in 1.5 liters of the anolyte solution, and the temperature of the anode compartment was maintained a 60° to 80°C. using a thermometer 17 and an external heater 18. The catholyte feed solution passing through the membrane and the anolyte solution continuously overflowed from the overflow opening 16 during the period of operation.

The cathode 7 and the anode 6 were short-circuited by means of the conductor 11 to which an ammeter was attached, and a short-circuit current flowing through the conductor was measured. Changes of the short-circuit current over the entire operating period (17.5 hours) are shown in FIG. 4.

The total amount of current that flowed through the ammeter was 9.7 Ah. The amount of copper precipitated on the copper cathode was 10.7 g. From this, the cathode current efficiency was calculated as 94%.

The relation of the pH of the catholye solution and the short-circuit summarized on the basis of FIG. 4 is as follows:

| pH of the feed solution | 3.7 | 1.5 | 1.1 |
|---|---|---|---|
| Short-circuit current (A) | 0.2–0.26 | 0.6 | 0.8–0.83 |

It can be see from these results that the pH of the feed solution is desirably not more than 2.

EXAMPLE 2

Except as noted below, the operation was performed for a total of 94 hours in the same way as in Example 1. An ion-exchange membrane (NAFION, No. 170, a product of E. I. du Pont de Numours & Co.) was used as the diaphragm. A sulfuric acid solution containing 32 g/liter of $Cu^{2+}$ ions acidified with sulfuric acid and maintained at a pH of not more than 1 was used as the catholyte solution, and flowed at a rate of 20 ml/min. from the outlet provided in the cathode compartment. The anolyte solution was an aqueous solution alkalized with ammonia and containing 0.5 mol/liter of ammonium chloride and 0.1 mol/liter of copper (II)-ammonia complex, which was adjusted to pH 12–9. The amount of the white metal powder was 100g, and the temperature of the cell was adjusted to 70°–75°C.

The total amount of short-circuit current that flowed through the ammeter was 73.9 Ah, and the average current was 0.79 A throughout the period of operation. The average current for a period of 23 hours between 39 hours and 62 hours after the initiation of the operation was 1.32 A. The amount of copper precipitated on the cathode was 85.4 g, and the cathode current efficiency was calculated as 97.5%. Also 81% of the copper in the white metal charged into the anode compartment was oxidized and dissolved. The anode current efficiency calculated from this was 73.1%.

The potential of the cathode, measured by means of a copper cathode-saturated calomel electrode, was about 50 mV. The potential of the suspension within the anode compartment, measured by using a platinum electrode — saturated calomel electrode, was −400 mV to −140 mV.

Example 3

The operation was performed for 18 hours in the same way as in Example 2 except that 200 g of blister copper powder (having a copper content of 98%) with a particle size of −100 mesh was suspended in the anolyte solution.

The total amount of the current that flowed through the ammeter was 44.2 Ah, and the average current throughout the entire period was 2.46 A. The average current between 6 hours and 18 hours after the initiation of the operation was 3.25 A.

The amount of copper precipitated on the cathode was 80.4 g, and the cathode current efficiency calculated from this was 77.1%. Also, 120.6g of the copper powder charged in the anode compartment was dissolved. The anode current efficiency calculated from this was 115.6%.

The potential of the cathode, measured by means of a copper cathode-saturated calomel electrode, was about 50 mV, and the potential of the catholyte suspension in the anode compartment, as measured by means of a platinum electrode-saturated calomel electrode, was −440 to −400 mV.

Example 4

The operation was performed for 11 hours in the same way as in Example 2 except that an ammoniacal solution of ammonium sulfate containing 0.5 mol/liter of $Fe(OH)_2$ and having a pH of 9 was fed into the anode compartment, and the temperature of the galvanic cell was changed to 60°C.

The reaction proceeded in two stages. In the first stage, the average current was 2.4 A to the end of 4 hours from the initiation of the reaction. In the second stage, after 4 hours, the current decreased abruptly, and the average current was 0.33 A. The total amount of current was 12.67 Ah, and the cathode curent efficiency for copper precipitation was 94.3%.

Oxidation of $Fe(OH)_2$ in the anode compartment proceeded in two stages. In the first stage wherein the higher current was obtained as mentioned above, the anode current efficiency for oxidation of $Fe(OH)_2$ was 88.7%.

After the electrolysis, the precipitate in the anode compartment was black in color and magnetic, and was composed of $Fe_3O_4$. In this electrolysis, iron (II) could not be completely converted to iron (III). It is effective to terminate the electrolysis at the end of the first stage in which $Fe_3O_4$ was formed.

The potential in the cathode compartment was about 40 mV, and the potential of the anolyte suspension in the anode compartment was −700 mV in the first stage, and about −400 mV in the second stage.

What we claim is:

1. A method for electrochemically refining copper, which comprises placing a catholyte solution consisting of a copper ion aqueous solution in the cathode compartment and an anolyte solution consisting of an aqueous dispersion of particles of matte, white metal or blister copper or particles of ferrous hydroxide in an electrolyte in the anode compartment of a galvanic cell partitioned into a cathode compartment and an anode compartment by a diaphragm; and short-circuiting a cathode dipped in the catholyte solution and an anode dipped in the anolyte solution by means of a conductor while maintaining the pH of the catholyte solution at −1 to 5 and the pH of the anolyte solution at 8 to 14, to precipitate pure copper.

2. The method of claim 1 wherein the temperature of the cell is maintained a 50°C. or more.

3. The method of claim 2 wherein the temperature is at least 60°C.

4. The method of claim 3 wherein the temperature is from 70° to 90°C.

5. The method of claim 1 wherein the anolyte particles are ferrous hydroxide and the diaphragm is an ion-exchange membrane.

6. The method of claim 5 wherein pure copper particles are suspended in the catholyte solution and pure copper is precipitated on the suspended pure copper particles.

7. The method of claim 5 wherein the catholyte solution is continuously fed into the cathode compartment, and the anolyte solution consisting of an aqueous dispersion of ferrous hydroxide is continuously fed into the anode compartment.

8. The method of claim 1 wherein the copper ion concentration of the catholyte is from 5 to 70 g/liter as monovalent or divalent ions.

9. The method of claim 8 wherein the concentration is from 10 to 50 g/liter.

10. The method of claim 1 wherein pure copper particles are suspended in the catholyte solution and pure copper is precipitated on the suspended pure copper particles.

11. The method of claim 1 wherein the catholyte solution is selected from the group consisting of an aqueous solution of cupric sulfate acidified with sulfuric acid, an aqueous solution of cuprous chloride acidified with hydrochloric acid, and an aqueous solution of cupric chloride acidified with hydrochloric acid.

12. The method of claim 1 wherein the anolyte solution is selected from the group consisting of an aqueous solution of ammonium sulfate and an aqueous solution of ammonium chloride, each made basic with sodium hydroxide or ammonia.

13. The method of claim 1 wherein the catholyte solution is fed continuously into the cathode compartment and the anolyte solution having a matte, white metal or blister copper particles suspended therein is continuously fed into the anode compartment.

14. The method of claim 1 wherein the pH of the catholyte is from 0 to 1.5.

15. The method of claim 1 wherein the salt concentration of the anolyte is from 0.05 to 2 mols/liter.

16. The method of claim 15 wherein the concentration is from 0.1 to 1.0 mol/liter.

17. The method of claim 1 wherein the pH of the anolyte is from 8.5 to 9.5.

18. The method of claim 1 wherein a water-permeable diaphgram is used, and the hydraulic pressure of the catholyte solution is maintained at higher than that of the anolyte solution.

19. The method of claim 1 wherein the matte particles in the anolyte have an iron concentration of not more than 10%.

20. The method of claim 1 wherein the cathode is a pure copper plate.

* * * * *